US007895088B2

(12) United States Patent
Hunter

(10) Patent No.: US 7,895,088 B2
(45) Date of Patent: *Feb. 22, 2011

(54) SYSTEM PERMITTING THE DISPLAY OF VIDEO OR STILL IMAGE CONTENT ON SELECTED DISPLAYS OF AN ELECTRONIC DISPLAY NETWORK ACCORDING TO CUSTOMER DICTATES

(75) Inventor: Charles Eric Hunter, Hilton Head Island, SC (US)

(73) Assignee: Novus Partners, LLC, Cincinnati, OH (US)

( * ) Notice: Subject to any disclaimer, the term of this patent is extended or adjusted under 35 U.S.C. 154(b) by 1676 days.

This patent is subject to a terminal disclaimer.

(21) Appl. No.: 10/133,396

(22) Filed: Apr. 29, 2002

(65) Prior Publication Data

US 2002/0162113 A1    Oct. 31, 2002
US 2007/0186253 A2    Aug. 9, 2007

Related U.S. Application Data

(63) Continuation of application No. 09/315,111, filed on May 18, 1999, now Pat. No. 6,424,998, which is a continuation of application No. 09/301,102, filed on Apr. 28, 1999, now Pat. No. 6,430,603.

(51) Int. Cl.
    *G06F 17/30* (2006.01)
(52) U.S. Cl. ............... 705/27; 705/14.28; 709/207; 709/217; 709/218; 725/74
(58) Field of Classification Search .......... 709/207, 709/217, 218; 705/14.58, 27; 725/74
See application file for complete search history.

(56) References Cited

U.S. PATENT DOCUMENTS

| 3,373,517 | A | 3/1968 | Halperin |
| 3,376,465 | A | 4/1968 | Corpew |
| 3,614,727 | A | 10/1971 | Fritts |
| 3,848,193 | A | 11/1974 | Martin |

(Continued)

FOREIGN PATENT DOCUMENTS

AU        48849 90  A       8/1990

(Continued)

OTHER PUBLICATIONS

Steven A. Morley, "Making Digital Cinema Actually Happen—What It Takes and Who's Going to Do It," *Qualcomm Incorporated*, Oct. 31, 1998.

(Continued)

*Primary Examiner*—Brian T Pendleton
*Assistant Examiner*—Olugbenga Idowu
(74) *Attorney, Agent, or Firm*—Frost Brown Todd LLC

(57) ABSTRACT

Commercial advertisers, such as consumer product companies and the advertising agents that represent them, directly access a network of thousands of large, high resolution electronic displays located in high traffic areas and directly send their own advertisements electronically to the network to be displayed at locations and times selected by the advertisers. In another application, operators of digital movie theaters have ongoing, continuous access to tens of thousands of movies that can be ordered in digital form for display on selected screens at their theaters at selected times.

16 Claims, 4 Drawing Sheets

U.S. PATENT DOCUMENTS

| | | |
|---|---|---|
| 3,941,926 A | 3/1976 | Slobodzian et al. |
| 3,983,317 A | 9/1976 | Glorioso |
| 3,993,955 A | 11/1976 | Belcher |
| 4,094,010 A | 6/1978 | Pepper |
| 4,126,854 A | 11/1978 | Sheridon |
| 4,155,042 A | 5/1979 | Permut |
| 4,332,022 A | 5/1982 | Ceshkovsky |
| 4,368,485 A | 1/1983 | Midland |
| 4,476,488 A | 10/1984 | Merrell |
| 4,536,791 A | 8/1985 | Campbell |
| 4,559,480 A | 12/1985 | Nobs |
| 4,575,750 A | 3/1986 | Callahan |
| 4,595,950 A | 6/1986 | Lofberg |
| 4,654,482 A | 3/1987 | DeAngelis |
| 4,716,410 A | 12/1987 | Nozaki |
| 4,734,779 A | 3/1988 | Levis et al. |
| 4,734,858 A | 3/1988 | Schlafly |
| 4,761,641 A | 8/1988 | Schreiber |
| 4,797,913 A | 1/1989 | Kaplan |
| 4,812,843 A | 3/1989 | Champion, III et al. |
| 4,829,569 A | 5/1989 | Seth-Smith |
| 4,847,825 A | 7/1989 | Levine |
| 4,862,268 A | 8/1989 | Campbell |
| 4,908,713 A | 3/1990 | Levine |
| 4,949,187 A | 8/1990 | Cohen |
| 5,046,090 A | 9/1991 | Walker |
| 5,051,822 A | 9/1991 | Rhoades |
| 5,073,925 A | 12/1991 | Nagata |
| 5,099,319 A | 3/1992 | Esch et al. |
| 5,107,107 A | 4/1992 | Osborne |
| 5,121,430 A | 6/1992 | Ganzer |
| 5,123,046 A | 6/1992 | Levine |
| 5,133,079 A | 7/1992 | Ballantyne |
| 5,133,081 A | 7/1992 | Mayo |
| 5,150,116 A | 9/1992 | West |
| 5,182,669 A | 1/1993 | Chikuma |
| 5,191,573 A | 3/1993 | Hair |
| 5,214,793 A | 5/1993 | Conway et al. |
| 5,233,423 A | 8/1993 | Jernigan et al. |
| 5,235,587 A | 8/1993 | Bearden |
| 5,251,193 A | 10/1993 | Nelson |
| 5,257,017 A | 10/1993 | Jones et al. |
| 5,260,778 A | 11/1993 | Kauffman |
| 5,274,762 A | 12/1993 | Peterson et al. |
| 5,280,570 A | 1/1994 | Jordan |
| 5,283,731 A | 2/1994 | LaLonde |
| 5,297,204 A | 3/1994 | Levine |
| 5,309,174 A | 5/1994 | Minkus |
| 5,311,357 A | 5/1994 | Summer et al. |
| 5,311,423 A | 5/1994 | Clark |
| 5,319,735 A | 6/1994 | Preuss |
| 5,353,399 A | 10/1994 | Kuwamoto et al. |
| 5,355,302 A | 10/1994 | Martin |
| 5,365,282 A | 11/1994 | Levine |
| 5,373,330 A | 12/1994 | Levine |
| 5,389,945 A | 2/1995 | Sheridan |
| 5,392,066 A | 2/1995 | Fisher |
| 5,412,416 A | 5/1995 | Nemirofsky |
| 5,414,756 A | 5/1995 | Levine |
| 5,418,713 A | 5/1995 | Allen |
| 5,420,647 A | 5/1995 | Levine |
| 5,420,923 A | 5/1995 | Beyers, II |
| 5,428,606 A | 6/1995 | Moskowitz |
| 5,451,998 A | 9/1995 | Hamrick |
| 5,465,291 A | 11/1995 | Barrus |
| 5,465,384 A * | 11/1995 | Bejan et al. ............ 455/2.01 |
| 5,469,020 A | 11/1995 | Herrick |
| 5,473,584 A | 12/1995 | Oshima |
| 5,486,819 A | 1/1996 | Horie |
| 5,495,283 A | 2/1996 | Cowe |
| 5,497,186 A | 3/1996 | Kawasaki |
| 5,497,479 A | 3/1996 | Hornbuckle |
| 5,504,675 A | 4/1996 | Cragun et al. |
| 5,508,815 A | 4/1996 | Levine |
| 5,510,828 A | 4/1996 | Lutterbach et al. |
| 5,512,935 A | 4/1996 | Majeti |
| 5,513,260 A | 4/1996 | Ryan |
| 5,515,098 A * | 5/1996 | Carles ..................... 725/35 |
| 5,515,268 A | 5/1996 | Yoda |
| 5,521,631 A | 5/1996 | Budow et al. |
| 5,530,751 A | 6/1996 | Morris |
| 5,532,920 A | 7/1996 | Hartrick |
| 5,543,856 A | 8/1996 | Rosser et al. |
| 5,550,928 A * | 8/1996 | Lu et al. ................. 382/116 |
| 5,557,541 A | 9/1996 | Schulhof |
| 5,559,549 A | 9/1996 | Hendricks |
| 5,565,909 A | 10/1996 | Thibadeau |
| 5,566,353 A | 10/1996 | Cho et al. |
| 5,568,181 A | 10/1996 | Greenwood et al. |
| 5,568,272 A | 10/1996 | Levine |
| 5,580,140 A | 12/1996 | Katz et al. |
| 5,592,248 A | 1/1997 | Norton et al. |
| 5,592,511 A | 1/1997 | Schoen |
| 5,592,551 A | 1/1997 | Lett |
| 5,592,626 A | 1/1997 | Papadimitriou |
| 5,600,839 A | 2/1997 | MacDonald |
| 5,604,027 A | 2/1997 | Sheridan |
| 5,612,741 A | 3/1997 | Loban et al. |
| 5,619,247 A | 4/1997 | Russo |
| 5,621,863 A | 4/1997 | Boulet |
| 5,627,549 A | 5/1997 | Park |
| 5,627,895 A | 5/1997 | Owaki |
| 5,628,050 A | 5/1997 | McGraw |
| 5,630,067 A | 5/1997 | Kindell et al. |
| 5,638,113 A | 6/1997 | Lappington |
| 5,640,453 A | 6/1997 | Schuchman |
| 5,644,859 A | 7/1997 | Hsu |
| 5,646,603 A | 7/1997 | Nagata |
| 5,646,997 A | 7/1997 | Barton |
| 5,654,747 A | 8/1997 | Ottesen |
| 5,659,366 A | 8/1997 | Kerman |
| 5,659,613 A | 8/1997 | Copeland |
| 5,661,516 A | 8/1997 | Carles |
| 5,664,018 A | 9/1997 | Leighton |
| 5,664,948 A | 9/1997 | Dimitriadis et al. |
| 5,675,734 A | 10/1997 | Hair |
| 5,684,918 A | 11/1997 | Abecassis |
| 5,686,954 A | 11/1997 | Yoshinobu |
| 5,689,799 A | 11/1997 | Dougherty |
| 5,692,214 A | 11/1997 | Levine |
| 5,701,161 A | 12/1997 | Williams |
| 5,701,383 A | 12/1997 | Russo |
| 5,701,397 A | 12/1997 | Steimle |
| 5,708,961 A | 1/1998 | Hylton et al. |
| 5,710,869 A | 1/1998 | Godefray |
| 5,717,814 A | 2/1998 | Abecassis |
| 5,717,832 A | 2/1998 | Steimle |
| 5,721,827 A | 2/1998 | Logan |
| 5,721,951 A | 2/1998 | DorEl |
| 5,724,062 A | 3/1998 | Hunter |
| 5,724,064 A | 3/1998 | Stefik |
| 5,724,091 A | 3/1998 | Freeman |
| 5,724,525 A | 3/1998 | Beyers, II |
| 5,729,214 A | 3/1998 | Moore |
| 5,734,413 A | 3/1998 | Lappington |
| 5,737,533 A | 4/1998 | de Hond |
| 5,739,808 A | 4/1998 | Suga et al. |
| 5,740,326 A | 4/1998 | Boulet |
| 5,748,716 A | 5/1998 | Levine |
| 5,758,257 A | 5/1998 | Herz |
| 5,760,820 A | 6/1998 | Eda |
| 5,761,601 A | 6/1998 | Nemirofsky |
| 5,761,606 A | 6/1998 | Wolzien |
| 5,769,269 A | 6/1998 | Peters |

| Patent | Date | Name |
|---|---|---|
| 5,781,734 A | 7/1998 | Ohno et al. |
| 5,790,202 A | 8/1998 | Kummer |
| 5,790,937 A | 8/1998 | Gutle |
| 5,793,343 A | 8/1998 | Hart |
| 5,799,285 A | 8/1998 | Klingman |
| 5,805,154 A | 9/1998 | Brown |
| 5,805,763 A | 9/1998 | Lawler |
| 5,809,139 A | 9/1998 | Girod |
| 5,809,481 A | 9/1998 | Baron et al. |
| 5,818,806 A | 10/1998 | Wong |
| 5,822,432 A | 10/1998 | Moskowitz |
| 5,825,407 A | 10/1998 | Cowe |
| 5,826,123 A | 10/1998 | Lai |
| RE35,954 E | 11/1998 | Levine |
| 5,832,287 A | 11/1998 | Atalla |
| 5,835,896 A | 11/1998 | Fisher |
| 5,841,979 A | 11/1998 | Schulhof |
| 5,845,083 A | 12/1998 | Hamadani et al. |
| 5,848,129 A | 12/1998 | Baker |
| 5,848,155 A | 12/1998 | Cox |
| 5,848,352 A | 12/1998 | Dougherty |
| 5,852,812 A | 12/1998 | Reeder |
| 5,854,779 A | 12/1998 | Johnson |
| 5,860,068 A | 1/1999 | Cook |
| 5,870,717 A | 2/1999 | Weicha |
| 5,874,985 A | 2/1999 | Matthews, III |
| 5,889,868 A | 3/1999 | Moskowitz |
| 5,890,136 A | 3/1999 | Kipp |
| 5,892,535 A | 4/1999 | Allen et al. |
| 5,897,622 A | 4/1999 | Blinn |
| 5,898,384 A | 4/1999 | Alt et al. ................ 340/825.36 |
| 5,899,980 A | 5/1999 | Wilf |
| 5,903,878 A | 5/1999 | Talati |
| 5,905,800 A | 5/1999 | Moskowitz |
| 5,907,793 A * | 5/1999 | Reams ....................... 725/122 |
| 5,909,492 A | 6/1999 | Payne |
| 5,913,039 A | 6/1999 | Nakamura et al. |
| 5,915,027 A | 6/1999 | Cox |
| 5,915,068 A | 6/1999 | Levine |
| 5,917,553 A | 6/1999 | Honey et al. |
| 5,918,213 A | 6/1999 | Bernard |
| 5,923,252 A | 7/1999 | Sizer et al. |
| 5,926,116 A | 7/1999 | Kitano et al. |
| 5,930,026 A | 7/1999 | Jacobson |
| 5,930,369 A | 7/1999 | Cox |
| 5,933,798 A | 8/1999 | Linnartz |
| 5,933,811 A | 8/1999 | Angles et al. |
| 5,934,795 A | 8/1999 | Rykowski et al. ........... 362/309 |
| 5,937,392 A | 8/1999 | Alberts |
| 5,940,073 A | 8/1999 | Klosterman et al. |
| 5,940,135 A | 8/1999 | Petrovic |
| 5,940,807 A | 8/1999 | Purcell |
| 5,943,670 A | 8/1999 | Prager |
| 5,946,646 A | 8/1999 | Schena et al. |
| 5,946,665 A | 8/1999 | Suzuki |
| 5,949,885 A | 9/1999 | Leighton |
| 5,950,173 A | 9/1999 | Perkowski |
| 5,955,710 A | 9/1999 | DiFranza |
| 5,956,024 A | 9/1999 | Strickland et al. |
| 5,959,945 A | 9/1999 | Klieman |
| 5,960,081 A | 9/1999 | Vynne |
| 5,960,411 A | 9/1999 | Hartman |
| 5,961,804 A | 10/1999 | Jacobson |
| 5,963,264 A | 10/1999 | Jackson |
| 5,963,915 A | 10/1999 | Kirsch |
| 5,963,917 A | 10/1999 | Ogram |
| 5,966,440 A | 10/1999 | Hair |
| 5,966,696 A | 10/1999 | Giraud |
| 5,966,697 A | 10/1999 | Fergerson |
| 5,969,283 A | 10/1999 | Looney |
| 5,969,715 A | 10/1999 | Dougherty |
| 5,970,471 A | 10/1999 | Hill |
| 5,970,472 A | 10/1999 | Alsop |
| 5,970,473 A | 10/1999 | Gerzberg |
| 5,970,474 A | 10/1999 | Leroy |
| 5,970,475 A | 10/1999 | Barnes |
| 5,974,396 A | 10/1999 | Anderson |
| 5,974,398 A | 10/1999 | Hanson et al. |
| 5,978,775 A | 11/1999 | Chen |
| 5,980,090 A | 11/1999 | Royal, Jr. et al. |
| 5,983,199 A | 11/1999 | Kaneko |
| 5,983,200 A | 11/1999 | Slotznick |
| 5,983,201 A | 11/1999 | Fay |
| 5,988,078 A | 11/1999 | Levine |
| 5,991,737 A | 11/1999 | Chen |
| 5,992,888 A | 11/1999 | North et al. .................... 283/56 |
| 6,002,450 A | 12/1999 | Darbee et al. |
| 6,002,772 A | 12/1999 | Saito |
| 6,002,853 A | 12/1999 | de Hond |
| 6,005,534 A | 12/1999 | Hylin et al. |
| 6,009,409 A | 12/1999 | Adler et al. |
| 6,013,007 A | 1/2000 | Root |
| 6,014,247 A | 1/2000 | Winter |
| 6,014,491 A | 1/2000 | Hair |
| 6,015,344 A | 1/2000 | Kelly et al. |
| 6,025,868 A | 2/2000 | Russo |
| 6,026,375 A | 2/2000 | Hall |
| 6,029,045 A | 2/2000 | Picco et al. |
| 6,029,141 A | 2/2000 | Bezos |
| 6,052,554 A | 4/2000 | Hendricks |
| 6,058,417 A | 5/2000 | Hess |
| 6,060,993 A | 5/2000 | Cohen |
| 6,065,969 A | 5/2000 | Rifkin |
| 6,067,107 A | 5/2000 | Travaille |
| 6,067,185 A | 5/2000 | Albert |
| 6,067,532 A | 5/2000 | Gebb |
| 6,073,372 A | 6/2000 | Davis ....................... 40/124.16 |
| 6,073,727 A | 6/2000 | Di Franza et al. |
| 6,085,177 A | 7/2000 | Semple et al. |
| 6,091,883 A | 7/2000 | Artigalas |
| 6,115,348 A | 9/2000 | Guerra |
| 6,120,588 A | 9/2000 | Jacobson |
| 6,124,851 A | 9/2000 | Jacobson |
| 6,130,773 A | 10/2000 | Jacobson |
| 6,141,530 A * | 10/2000 | Rabowsky .................. 725/116 |
| 6,148,142 A | 11/2000 | Anderson |
| 6,148,428 A | 11/2000 | Welch |
| 6,150,964 A | 11/2000 | McLaughlin |
| 6,154,220 A | 11/2000 | Prakriya et al. |
| 6,157,396 A | 12/2000 | Margulis et al. |
| 6,167,358 A | 12/2000 | Othmer et al. |
| 6,172,798 B1 | 1/2001 | Albert et al. |
| 6,177,921 B1 | 1/2001 | Comiskey |
| 6,186,893 B1 | 2/2001 | Walker et al. |
| 6,215,411 B1 | 4/2001 | Gothard |
| 6,219,696 B1 | 4/2001 | Wynblatt et al. |
| 6,221,267 B1 | 4/2001 | Ikeda |
| 6,223,027 B1 | 4/2001 | Ono |
| 6,232,950 B1 | 5/2001 | Albert |
| 6,233,389 B1 | 5/2001 | Barton |
| 6,233,682 B1 | 5/2001 | Fritsch |
| 6,236,330 B1 | 5/2001 | Cohen |
| 6,240,401 B1 | 5/2001 | Oren |
| 6,243,740 B1 | 6/2001 | Minneman et al. |
| 6,249,332 B1 | 6/2001 | Bryan-Brown |
| 6,252,522 B1 | 6/2001 | Hampton |
| 6,253,189 B1 | 6/2001 | Feezell |
| 6,266,442 B1 | 7/2001 | Laumeyer et al. |
| 6,285,984 B1 | 9/2001 | Speicher |
| 6,288,688 B1 | 9/2001 | Hughes et al. |
| 6,294,284 B1 | 9/2001 | Lynch |
| 6,332,127 B1 | 12/2001 | Bandera et al. |
| 6,356,794 B1 | 3/2002 | Perin et al. |
| 6,384,736 B1 | 5/2002 | Guthard |
| 6,385,592 B1 | 5/2002 | Angles et al. |
| 6,396,205 B1 | 5/2002 | Sprague |

| | | | | | | |
|---|---|---|---|---|---|---|
| 6,408,278 B1 * | 6/2002 | Carney et al. ............... 705/14 | | 2001/0032132 A1 | 10/2001 | Moran |
| 6,411,725 B1 | 6/2002 | Rhoads | | 2001/0032133 A1 | 10/2001 | Moran |
| 6,424,845 B1 | 7/2002 | Emmoft | | 2001/0032187 A1 | 10/2001 | Nuttall |
| 6,424,998 B2 | 7/2002 | Hunter | | 2001/0032312 A1 | 10/2001 | Runje |
| 6,429,812 B1 | 8/2002 | Hoffberg | | 2001/0034635 A1 | 10/2001 | Winters |
| 6,430,603 B2 | 8/2002 | Hunter | | 2001/0034714 A1 | 10/2001 | Terao |
| 6,430,605 B2 | 8/2002 | Hunter | | 2001/0034883 A1 | 10/2001 | Zigmond |
| 6,434,479 B1 | 8/2002 | Kondou et al. | | 2002/0023010 A1 | 2/2002 | Rittmaster et al. |
| 6,442,529 B1 | 8/2002 | Krishan | | 2002/0055880 A1 | 5/2002 | Unold |
| 6,446,045 B1 | 9/2002 | Stone | | 2002/0080093 A1 | 6/2002 | Bandura |
| 6,463,585 B1 | 10/2002 | Hendricks et al. | | 2002/0087335 A1 | 7/2002 | Meyers et al. |
| 6,473,072 B1 | 10/2002 | Comiskey | | 2002/0091738 A1 | 7/2002 | Rohrabaugh |
| 6,484,148 B1 | 11/2002 | Boyd | | 2002/0097193 A1 | 7/2002 | Powers |
| 6,507,764 B1 | 1/2003 | Parrella et al. | | 2002/0099533 A1 | 7/2002 | Jaqua |
| 6,538,801 B2 | 3/2003 | Jacobson et al. | | 2002/0101393 A1 | 8/2002 | Bandura |
| 6,539,417 B2 | 3/2003 | Stern | | 2002/0116717 A1 | 8/2002 | Eller et al. |
| 6,553,404 B2 | 4/2003 | Stern | | 2002/0156858 A1 | 10/2002 | Hunter |
| 6,560,649 B1 | 5/2003 | Mullen | | 2002/0165776 A1 | 11/2002 | Hunter |
| 6,571,279 B1 | 5/2003 | Herz | | 2003/0001796 A1 | 1/2003 | Wampler et al. |
| 6,573,830 B2 | 6/2003 | Cohen et al. | | 2003/0001830 A1 | 1/2003 | Wampler et al. |
| 6,573,880 B1 | 6/2003 | Simoni et al. | | 2003/0004805 A1 | 1/2003 | Vaitekunas et al. |
| 6,587,755 B1 | 7/2003 | Smith et al. | | 2003/0004806 A1 | 1/2003 | Vaitekunas |
| 6,591,247 B2 | 7/2003 | Stern | | 2003/0046158 A1 | 3/2003 | Kratky |
| 6,606,602 B1 | 8/2003 | Kolls | | 2003/0046162 A1 | 3/2003 | Nestel |
| 6,611,810 B1 | 8/2003 | Kolls | | 2003/0061353 A1 | 3/2003 | Johnson et al. |
| 6,622,142 B1 | 9/2003 | Murray et al. | | 2003/0088463 A1 | 5/2003 | Kanevsky et al. |
| 6,622,826 B2 | 9/2003 | Amo et al. | | 2003/0149601 A1 | 8/2003 | Cabral |
| 6,637,030 B1 * | 10/2003 | Klein ..................... 725/78 | | 2003/0182184 A1 | 9/2003 | Strasnick et al. |
| 6,639,608 B1 | 10/2003 | Itakura | | 2003/0195670 A1 | 10/2003 | Smith et al. |
| 6,654,757 B1 | 11/2003 | Stern | | 2004/0036622 A1 | 2/2004 | Dukach et al. |
| 6,684,249 B1 | 1/2004 | Frerichs et al. | | 2004/0212548 A1 | 10/2004 | Ruttenberg |
| 6,698,020 B1 * | 2/2004 | Zigmond et al. .......... 725/34 | | 2005/0021393 A1 | 1/2005 | Bao et al. |
| 6,701,143 B1 | 3/2004 | Dukach | | 2005/0028208 A1 * | 2/2005 | Ellis et al. ............... 725/58 |
| 6,731,238 B2 | 5/2004 | Johnson | | 2006/0050012 A1 | 3/2006 | Eller et al. |
| 6,738,978 B1 | 5/2004 | Hendricks et al. | | | | |
| 6,753,830 B2 | 6/2004 | Gelbman | | | FOREIGN PATENT DOCUMENTS | |
| 6,754,636 B1 | 6/2004 | Walker et al. | | | | |
| 6,760,916 B2 | 7/2004 | Holtz et al. | | CA | 2064855 | 3/1991 |
| 6,769,010 B1 | 7/2004 | Knapp et al. | | CA | 2189454 | 11/1995 |
| 6,819,303 B1 | 11/2004 | Berger et al. | | CA | 2231376 | 3/1997 |
| 6,829,301 B1 * | 12/2004 | Tinker et al. ........ 375/240.12 | | CA | 2371293 A | 11/2000 |
| 6,847,969 B1 | 1/2005 | Mathai et al. | | CH | 686 750 A5 | 6/1996 |
| 6,864,875 B2 | 3/2005 | Drzaic et al. | | EP | 0 131 211 | 1/1985 |
| 7,038,637 B1 | 5/2006 | Eller et al. | | EP | 0683943 B1 | 11/1993 |
| 7,382,334 B1 | 6/2008 | Hylin et al. | | EP | 0954176 A2 | 11/1999 |
| 2001/0002852 A1 | 6/2001 | Kwoh | | EP | 0954179 A2 | 11/1999 |
| 2001/0003846 A1 | 6/2001 | Rowe | | EP | 0975111 A2 | 1/2000 |
| 2001/0005906 A1 | 6/2001 | Humpleman | | EP | 0977389 A2 | 2/2000 |
| 2001/0010045 A1 | 7/2001 | Stefik | | EP | 0984631 A1 | 3/2000 |
| 2001/0010095 A1 | 7/2001 | Ellis | | EP | 0994470 A2 | 4/2000 |
| 2001/0013037 A1 | 8/2001 | Matsumoto | | EP | 1104195 A2 | 5/2001 |
| 2001/0013120 A1 | 8/2001 | Tsukamoto | | EP | 1143721 A1 | 10/2001 |
| 2001/0014882 A1 | 8/2001 | Stefik | | EP | 1244303 A2 | 9/2002 |
| 2001/0016836 A1 | 8/2001 | Boccon Gibod | | FR | 2634295 A1 | 1/1990 |
| 2001/0017920 A1 | 8/2001 | Son | | GB | 2346247 | 8/2000 |
| 2001/0018742 A1 | 8/2001 | Hirai | | JP | 7168544 | 7/1995 |
| 2001/0018858 A1 | 9/2001 | Dwek | | JP | 8163519 A | 6/1996 |
| 2001/0023416 A1 | 9/2001 | Hosokawa | | JP | 9006849 A | 1/1997 |
| 2001/0023417 A1 | 9/2001 | Stefik | | JP | 10207957 | 8/1998 |
| 2001/0023428 A1 | 9/2001 | Miyazaki | | WO | WO 91/03112 | 3/1991 |
| 2001/0024425 A1 | 9/2001 | Tsunoda | | WO | WO 95/12282 | 5/1995 |
| 2001/0024566 A1 | 9/2001 | Mankowitz | | WO | WO 96/34467 | 10/1996 |
| 2001/0025259 A1 | 9/2001 | Rouchon | | WO | WO 96/34494 | 10/1996 |
| 2001/0025269 A1 | 9/2001 | Otsuka | | WO | WO 96/26605 | 11/1996 |
| 2001/0025316 A1 | 9/2001 | Oh | | WO | WO 97/23831 | 7/1997 |
| 2001/0027561 A1 | 10/2001 | White | | WO | WO 97/41546 | 11/1997 |
| 2001/0027563 A1 | 10/2001 | White | | WO | WO 98/57270 | 12/1998 |
| 2001/0029491 A1 | 10/2001 | Yonetta | | WO | WO 99/03050 | 1/1999 |
| 2001/0029538 A1 | 10/2001 | Blockton | | WO | WO 99/18727 | 4/1999 |
| 2001/0029583 A1 | 10/2001 | Palatov | | WO | WO 99/35809 | 7/1999 |
| 2001/0030660 A1 | 10/2001 | Zainouiline | | WO | WO 99/50775 | 10/1999 |
| 2001/0031066 A1 | 10/2001 | Meyer | | | | |
| 2001/0032131 A1 | 10/2001 | Mowry | | | | |

| | | |
|---|---|---|
| WO | WO 00/07368 | 2/2000 |
| WO | WO 00/63771 | 4/2000 |
| WO | WO 00/52934 | 9/2000 |
| WO | WO 00/52935 | 9/2000 |
| WO | WO 00/65576 | 11/2000 |
| WO | WO 01/41013 | 6/2001 |
| WO | WO 01/47249 | 6/2001 |
| WO | WO 01/57763 | 8/2001 |
| WO | WO 01/65531 | 9/2001 |

OTHER PUBLICATIONS

International Search Report, dated Mar. 2, 2004 for PCT Application No. PCT/US02/19459.
International Search Report, dated Oct. 26, 2000 for PCT Application No. PCT/US00/11022.
International Search Report, dated Oct. 18, 2004 for PCT Application No. PCT/US04/011186.
Written Opinion, dated Oct. 18, 2004 for PCT Application No. PCT/US04/011186.
Observations, dated Jun. 2, 2003, filed against European Patent Application No. 00928351.6.
(Author unknown); "Scheduling InfoChannel Events," "Using ScalaNet," and "Additional InfoChannel EXes"; pp. 6-76; dated Jul. 23, 1996; (publisher unknown); (country of publication unknown).
Carol Hildebrand; "Movie Technology Puts an End to Bad Endings"; from *Computerworld*; (undated); (publisher unknown); (country of publication unknown).
James Daly; "Quiet on the Set! Lights, Camera, Digitize"; from *Computerworld*; (undated); (publisher unknown); (country of publication unknown).
Zimmermann et al.; "Bergens Tidene: A Small Revolution"; dated Jul. 24, 1998; (publisher unknown); (country of publication unknown).
(Author unknown); "Digital Programe Delivery: Digital Cinema"; dated Oct. 18, 2002; (publisher unknown); (country of publication unknown).
Jim Mendrala; "A Brief History of Film and Cinema"; dated Jul. 1, 2002; (publisher unknown); (country of publication unknown).
Dean Takahashi; "Pac Bell Plans New Way to Get Films Into Theaters"; from *The Los Angeles Times*; dated Apr. 28, 1992; Los Angeles Times; U.S.
(Author unknown); "E Cinema—Main Report"; (undated); (publisher unknown); (country of publication unknown).
Kjetil Jørgensen; "Dagens Næringsliv: CAPA Enters New Advertising Channel"; dated Aug. 5, 1998; (publisher unknown); (country of publication unknown).
David Griffiths; "Regarding: Update on Offer from Christie Digital Systems Inc."; dated Dec. 15, 1999; Christie Digital Systems Inc.; United Kingdom.
Patrick Von Sychowski; "Screen Digest's E-Cinema Alert #85"; dated Oct. 4, 2002; Screen Digest; (country of publication unknown).
Patrick Von Sychowski; "Screen Digest's E-Cinema Alert #86"; dated Oct. 14, 2002; Screen Digest; (country of publication unknown).
(Author unknown); "Kontrakt"; dated Feb. 11, 1998; (publisher unknown); (country of publication unknown).
(Author unknown); "Kontrakt"; dated Mar. 17, 1999; (publisher unknown); (country of publication unknown).
David J. Fox; "Pacific Bell Unveils a New Way of Looking at Movies Technology: A High-Definition Digital Projection Sent Over Fiber-Optic Telephone Lines Would Eliminate Film"; from *The Los Angeles Times*; dated Nov. 2, 1993; Los Angeles Times; U.S.
Office Action dated Sep. 8, 2004 for U.S. Appl. No. 10/175,057, filed Jun. 19, 2002.
Office Action dated Apr. 10, 2001 for U.S. Appl. No. 09/416,333, filed Oct. 12, 1999.
Office Action dated Jul. 18, 2000 for U.S. Appl. No. 09/416,333, filed Oct. 12, 1999.
Office Action dated Jul. 18, 2000 for U.S. Appl. No. 09/315,111, filed May 18, 1999.
Office Action dated Apr. 10, 2001 for U.S. Appl. No. 09/315,111, filed May 18, 1999.
Office Action dated Jul. 18, 2000 for U.S. Appl. No. 09/301,102, filed Apr. 28, 1999.
Office Action dated Apr. 10, 2001 for U.S. Appl. No. 09/301,102, filed Apr. 28, 1999.
Office Action dated Mar. 17, 2003 for U.S. Appl. No. 09/465,730, filed May 17, 2000.
Office Action dated Apr. 27, 2004 for U.S. Appl. No. 09/465,730, filed May 17, 2000.
English translation of Office Action dated Feb. 1, 2005 for JP Application No. 2000-614441, filed Oct. 29, 2001.
Office Action dated Apr. 9, 2004 for U.S. Appl. No. 10/133,343, filed Apr. 29, 2002.
Office Action dated May 27, 2004 for U.S. Appl. No. 10/133,733, filed Apr. 29, 2002.
Office Action dated May 19, 2005 for Israeli Application No. 146,160, filed Oct. 25, 2001 (with partial English translation).
Office Action dated Jun. 1, 2004 for Canadian Application No. 2,371,293, filed Apr. 24, 2000.
Office Action dated Feb. 23, 2005 for Canadian Application No. 2,371,293, filed Apr. 24, 2000.
Office Action dated Oct. 6, 2003 for U.S. Appl. No. 10/133,343, filed Apr. 29, 2002.
Office Action dated Jan. 7, 2005 for U.S. Appl. No. 10/133,343, filed Apr. 29, 2002.
Office Action dated May 2, 2005 for U.S. Appl. No. 10/412,539, filed Apr. 11, 2003.
Office Action dated Jan. 11, 2005 for U.S. Appl. No. 10/174,972, filed Jun. 19, 2002.
Office Action dated Mar. 26, 2004 for U.S. Appl. No. 10/174,972, filed Jun. 19, 2002.
Office Action dated Feb. 23, 2005 for U.S. Appl. No. 10/174,231, filed Jun. 19, 2002.
Office Action dated Mar. 26, 2004 for U.S. Appl. No. 10/174,231, filed Jun. 19, 2002.
Office Action dated Sep. 27, 2004 for U.S. Appl. No. 10/444,079, filed May 23, 2003.
Office Action dated Aug. 19, 2003 for U.S. Appl. No. 10/133,733, filed Apr. 29, 2002.
Office Action dated Jan. 21, 2005 for U.S. Appl. No. 10/133,733, filed Apr. 29, 2002.
Gyricon, Maestroware web page and FAQ sheet, printed Feb. 22, 2002 from www.gyriconmedia.com.
Gregory P. Crawford; "A Bright New Page in Portable Displays"; IEEE Spectrum; pp. 40-46; Oct. 2000, USA.
Office Action dated Aug. 9, 2005 for U.S. Appl. No. 10/174,231, filed Jun. 19, 2002.
Office Action dated Aug. 15, 2005 for U.S. Appl. No. 10/412,539, filed Apr. 11, 2003.
Office Action dated Jul. 26, 2005 for U.S. Appl. No. 10/422,331, filed Apr. 24, 2003.
Office Action dated Jul. 7, 2005 for U.S. Appl. No. 10/175,057, filed Jun. 19, 2002.
Office Action dated Feb. 28, 2005 for U.S. Appl. No. 09/465,730, filed May 17, 2000.
Karen J. Bannan; "How It Works; Streaming Onto the Movie Screen, With Nary a Scratch"; The New York Times; p. E5; May 9, 2002.
Office Action dated Sep. 9, 2005 for U.S. Appl. No. 10/133,733, filed Apr. 29, 2002.
From http://www.archives.net, a history of Internet operation of eBay.com and amazon.com.
From http://www.amazon.com, amazon.com, Inc. practices of merchandising products & contacts between sellers and buyers.
From http://www.eBay.com, eBay.com practices of merchandising products & contacts between sellers and buyers.
"Universal Product Code (UPC) and EAN Article Numbering Code (EAN) Page," http://www.adams1.com/pub/russadam/upccode.html, by Russ Adams.
"DataPlay, Inc.—Universal Recording Media—Discover," http://www.dataplay.com/jsp_files/en/discover/index-music.jsp, downloaded and printed on May 14, 2002, (Copyright 2001).

"DataPlay, Inc.—Universal Recording Media—What's Playing on DataPlay," http://www.dataplay.com/servlets/ProductList?action=productSearch, downloaded and printed on May 14, 2002, (Copyright 2001).

"DataPlay, Inc.—Universal Recording Media—What's Playing on DataPlay," http://www.dataplay.com/jsp_files/en/whatsplaying/products.jsp, downloaded and printed on May 14, 2002, (Copyright 2001).

"DataPlay, Inc.—Universal Recording Media—What's Playing on DataPlay," http://www.dataplay.com/jsp_files/en/whatsplaying/products.jsp?action=details, downloaded and printed on May 14, 2002, (Copyright 2001).

"DataPlay, Inc.—Universal Recording Media—Industry," http://www.dataplay.com/jsp_files/en/industry/products-digitalmedia.jsp, downloaded and printed on May 14, 2002, (Copyright 2001).

"DataPlay, Inc.—Universal Recording Media—Industry," http://www.dataplay.com/jsp_files/en/industry/products-engines.jsp, downloaded and printed on May 14, 2002, (Copyright 2001).

"DataPlay, Inc.—Universal Recording Media—Industry," http://www.dataplay.com/jsp_files/en/industry/contentproviders.jsp, downloaded and printed on May 14, 2002, (Copyright 2001).

"DataPlay, Inc.—Universal Recording Media—Industry," http://www.dataplay.com/jsp_files/en/industry/products-contentkey.jsp, downloaded and printed on May 14, 2002, (Copyright 2001).

"DataPlay, Inc.—Universal Recording Media—Industry," http://www.dataplay.com/jsp_files/en/industry/index.jsp, downloaded and printed on May 14, 2002, (Copyright 2001).

"What's Playing on DataPlay—Everything Digital," DataPlay Micro-optical Engine Product Brochure, downloaded and printed on May 14, 2002, (Copyright 2001).

"What's Playing on DataPlay—Everything Digital," DataPlay Digital Media Product Brochure, downloaded and printed on May 14, 2002, (Copyright 2000-2001).

"Calimetrics' Multilevel Technology Enables Higher-Performance CD/DVD Recorders: An IDC White Paper," Wolfgang Schlichting, (Copyright 2000).

"Wink Television Press Room," http://www.wink.com/contents/PressReleases.shtml, downloaded and printed on May 14, 2002.

"Wink Announces First National Advertising Partners: AT&T, Levi Strauss & Co., and GE," http://www.wink.com/contents/PressReleases/930708938.shtml, downloaded and printed on May 14, 2002, dated Sep. 9, 1998.

"Wink Communications, Inc. Changes the Advertising Landscape," hitp://www.wink.com/contents/PressReleases/930709807.shtml, downloaded and printed on May 14, 2002, dated Jan. 21, 1999.

"Wink's History," http://www.wink.com/contents/history.shtml, downloaded and printed on May 14, 2002.

"How Wink Works," http://www.wink.com/contents/howitworks.shtml, downloaded and printed on May 14, 2002.

"What is Wink: Examples," http://www.wink.com/contents/examples.shtml, downloaded and printed on May 14, 2002.

"The Wink System," http://www.wink.com/contents/tech_diagram.shtml, downloaded and printed on May 14, 2002.

"Wink Response Server and Wink Response Network," http://www.wink.com/contents/tech_wrs.shtml, downloaded and printed on May 14, 2002.

"ICAP and HTML (ATVEF)," http://www.wink.com/contents/tech_icap.shtml, downloaded and printed on May 14, 2002.

"Wink Studio and Wink Server Studio," http://www.wink.com/contents/tech_studio.shtml, downloaded and printed on May 14, 2002.

"Wink Broadcast Server," http://www.wink.com/contents/tech_wbs.shtml, downloaded and printed on May 14, 2002.

"Wink Client Software," http://www.wink.com/contents/tech_engine.shtml, downloaded and printed on May 14, 2002.

"Onsale Invoice," http://www.onsale.com/cgi-win/invoice.exe, dated Jan. 19, 1998, printed Jan. 20, 1998, (Copyright 1997).

Onsale Packing Sheet (Jason Deep Space Series 225×60 Astronomy Telescope), received Jul. 1999.

Egghead Packing Receipt (Franklin Rex Organizer), received Dec. 1999.

"Sell Goods to Egghead.com," http://www.egghead.com/ShowPage.dll?page=hd_aboutus_sellgoods_p, printed Sep. 29, 2001.

"Demographics Profile," http://www,egghead.com/ShowPage.dll?page=hd_aboutus_demo_p, printed Sep. 29, 2001.

"About us," http://www,egghead.com/ShowPage.dll?page=hd_aboutus_aboutus_p, printed Sep. 29, 2001.

"Privacy and Security Policy," http://www,egghead.com/ShowPage.dll?page=hd_policy_policyandprivacy_p, printed Sep. 29, 2001.

"Registration," http://www.egghead.com/ShowPage.dll?page=reg_page1_ceos&S=1, printed Sep. 26, 2001.

"New Credit Information," https://secure.fairmarket.com/secure/Cre . . . FM1001, printed Sep. 26, 2001.

"Quadrant 256MB, PC133 (PC-100 Compatible), 32×54, 7ns, 168-pin, SdRAM DIMM Module (N21)," wysiwyg://253/http://auctions.egghead.com . . . LotNo=65659811&BatchNo=0, printed Sep. 24, 2001.

"Ashton Digital VisionGate 52 15.1' TFT-LCD, Pivot Screen USB Hub, w/Speakers," wysiwyg://253/http://auctions.egghead.com . . . LotNo=66044439, printed Sep. 26, 2001.

"Login/Logout," http://www.egghead.com/ShowPage/dll?page . . . 44439, printed Sep. 29, 2001.

"Enter Your Bid," wysiwyg://218/http://auctions.egghead.com . . .5a99, printed Sep. 29, 2001.

"Enter Your Bid," https://auctions.egghead.com/scripts/ . . . LotNo=66044439, printed Sep. 29, 2001.

"Confirm Your Bid," wysiwyg://220/http://auctions.egghead.com . . . ShipCountry=US, Printed Sep. 29, 2001.

"Bid Receipt for Bid No. 5270411," wysivivg://220/http://auctions.egghead.com . . . KioskListing=0, printed Sep. 29, 2001.

Office Action dated Oct. 4, 2005 for U.S. Appl. No. 10/174,972, filed Jun. 19, 2002.

Office Action dated Oct. 11, 2005 for U.S. Appl. No. 10/133,343, filed Apr. 29, 2002.

U.S. Appl. No. 60/107,735, filed Jun. 2002, Carney et al.

EPO Search Report, dated Mar. 5, 2006 for PCT Application No. PCT/US00/11022.

Robert Mort; CINENET—Cinema Films and Live Events Via Satellite and Cable Networks; The Institution of Electrical Engineers; dated Mar. 13, 1997; United Kingdom.

Office Action dated Feb. 8, 2006 for U.S. Appl. No. 10/412,539, filed Apr. 11, 2003.

Office Action dated Mar. 29, 2006 for U.S. Appl. No. 10/133,343, filed Apr. 29, 2002.

Office Action dated May 5, 2006 for U.S. Appl. No. 09/465,730, filed May 17, 2000.

Office Action dated Feb. 24, 2006 for U.S. Appl. No. 10/133,733, filed Apr. 22, 2002.

Office Action dated Jan. 11, 2006 for CA Application Serial No. 2,371,293 filed Apr. 24, 2000.

Office Action dated Jan. 9, 2006 for IL Application No. 146,160.

English translation of Abstract for JP Patent No. 9,006,849 published Jan. 10, 1997.

English translation of Abstract for JP Patent No. 8,163,519 published Jun. 21, 1996.

Office Action dated Nov. 2, 2006 for U.S. Appl. No. 09/465,730, filed May 5, 2006.

Office Action dated Sep. 6, 2006 for U.S. Appl. No. 10/133,733, filed Apr. 29, 2002.

Office Action dated Sep. 29, 2006 for Canadian Application No. 2,371,293.

English Translation of Office Action dated Jul. 18, 2006 for Japanese Application No. 2000-614441.

Office Action dated Jun. 27, 2006 for Singapore Application No. 200506631-1.

Office Action dated Feb. 11, 2003 for U.S. Appl. No. 09/784,394, filed Feb. 15, 2001.

Office Action dated Aug. 15, 2003 for U.S. Appl. No. 09/784,394, filed Feb. 15, 2001.

Office Action dated Jul. 20, 2004 for U.S. Appl. No. 09/784,394, filed Feb. 15, 2001.

Examiner's Answer dated Oct. 26, 2005 for U.S. Appl. No. 09/784,394, filed Feb. 15, 2001.

English translation of Office Action dated Aug. 21, 2006 for Korean Application No. 2001-7008430.

English translation of Korean Laid-Open Patent Pub. No. 1999-7529.

Office Action dated Nov. 16, 2006 for U.S. Appl. No. 10/133,343, filed Apr. 29, 2002.

NAA Presstime: NEXPO '97 Report, Tech Tapped to Protect Classifieds, http://www.naa.org/presstime/97nexpo/nexad.html.

Office Action dated Aug. 25, 2009 for Application No. JP 2000-614190.

US 5,825,354, 10/1998, Ahmad (withdrawn)

* cited by examiner

SYSTEM PERMITTING THE DISPLAY OF VIDEO OR STILL IMAGE CONTENT ON SELECTED DISPLAYS OF AN ELECTRONIC DISPLAY NETWORK ACCORDING TO CUSTOMER DICTATES

CROSS REFERENCE TO RELATED APPLICATION

This is a continuation of co-pending U.S. application Ser. No. 09/315,111 filed May 18, 1999, the contents of which is herein incorporated by reference in its entirety, which is a continuation in part of application Ser. No. 09/301,102, filed Apr. 28, 1999, the contents of which is herein incorporated by reference in its entirety.

FIELD OF THE INVENTION

The invention relates to the display of video or still image content on electronic displays. More particularly, the invention relates to a network of thousands of electronic displays, such as electronic billboards or electronic digital movie displays, and a related system that permits display of content on selected displays according to customer dictates.

BACKGROUND OF THE INVENTION

Background, Advertising/Billboards

Consumer product advertising takes many forms, such as television commercials, newspaper and magazine advertisements, mailings, point-of-sale displays, outdoor billboards, etc. Using current advertising media, advertisers engage in a constant struggle to efficiently use their budgets to most effectively reach their geographic and demographic targets.

Focusing on the outdoor advertising component of advertising by consumer product companies, it is well known that outdoor billboards have traditionally taken the form of single-message displays formed of printed sheets or painted surfaces containing the advertising content adhered to a flat backing. This time-honored outdoor advertising technique has remained essentially unchanged throughout the twentieth century. The high cost of printing, transporting and mounting a message on a conventional billboard has dictated that the same message remain in place for a considerable period of time. Thus, a conventional billboard cannot be readily changed to reflect current events within the geographic area of the billboard. Additionally, the content on a conventional billboard tends to become essentially "invisible" as a part of the landscape after its content has been in place for a relatively short period of time, especially to commuters and others who regularly pass the billboard. Beyond the above problems with cost, single-message content, lack of content changeover capability, and the like, conventional outdoor billboards have come under increasing criticism because in their large numbers, and often tattered condition, they clutter highways with a distasteful form of visual "pollution". A reduction in the number of billboards and improvement of the appearance of those that remain, if accomplished while increasing the overall advertising impact afforded by outdoor advertising, would please virtually everyone.

The use of electronic billboards has been suggested, for example, in U.S. Pat. No. 5,612,741. However, there is no electronic billboard network in operation whereby commercial advertisers may directly place ads onto selected billboards at selected times through direct access to a master network. Such a network, properly designed and operated, promises to overcome the numerous disadvantages currently associated with the outdoor advertising industry, while also meeting the above needs of consumer products advertisers.

Background, Distribution and Display of Movies at Movie Theaters

For virtually the entire twentieth century the practice of distributing movies on film reels to movie theaters has gone fundamentally unchanged. As is well known, movie content is stored on large reels of film, one or more copies of which must be physically transported to each movie theater where the movie will be shown. The films are bulky, heavy, and expensive to reproduce and ship to movie theaters. Films also show wear and eventually must be removed from use. Obviously, a movie theater's ability to show a particular movie is subject to the film reels being physically present at the proper time. Thus, substantial lead time must be provided anytime a movie theater operator is preparing the schedule for his screen(s).

In addition to the above problems inherent in the current movie distribution scheme, the high cost of conventional film reel movie distribution results in most movies not going to full distribution. In this regard, the full distribution of a movie (the cost of film reels, transportation, etc.) can run up to four to five million dollars or more. As a related problem, the cost of making film reels of older movies, particularly non-"blockbuster" movies, available on an ongoing basis is prohibitive. Thus, theater owners and movie goers are deprived of movie theater screening for the vast majority of available movie content because the movies are not in current distribution. Importantly, as well, content providers (e.g., Disney, Warner Brothers, etc.) are deprived of the revenue from the movies for which ongoing, continuous distribution is simply too expensive.

There is an acute need for a new movie distribution system for the twenty first century that will overcome the above shortcomings of current movie distribution practices.

SUMMARY OF THE INVENTION

The present invention, in one broad respect, is a system that permits video (e.g., movies) or still image content to be displayed on selected ones of multiple, networked electronic displays at selected times according to dictates of the customers of the system.

According to one implementation of the invention, commercial advertisers, such as consumer product companies and the advertising agents that represent them, directly access a network of multiple, large, high resolution electronic displays located in high traffic areas and directly send their own advertisements electronically to the network to be displayed at locations and times selected by the advertisers. In preferred embodiments, this implementation of the invention includes a central information processing center that permits customers to review a schedule of times and electronic display locations that are available for placement of advertisements, and also permits customers to purchase available times at selected electronic display locations for placement of their advertising content. The customer then transmits his video or still image advertising content to the processing center where the content is reviewed for appropriateness and then transmitted to the customer-selected electronic display(s). The electronic displays preferably are large (e.g., 23×33½ ft.) flat LED displays that are driven by their own video or image servers. Verification that the advertisements run as ordered is facilitated by an information storage module or, more preferably, by a digital camera or series of digital cameras. A traffic counter may be used to determine the traffic that passed by the display while the advertisement was running. Bills and reports containing market and demographic analysis are generated and sent to the customer.

In another implementation of the invention, the operators of digital movie theaters have ongoing, continuous access to tens of thousands of movies that can be ordered in digital form for display on selected "screens" at their theaters at selected times. The movie theater operator is a customer of a system that permits the customer to review movies that are available in digital form and thereafter schedule and purchase a movie for display on the digital movie screens located at the customer's movie theater. The movies may be transmitted by the system to the movie theater operators by a number of transmission modes, most preferably a satellite uplink/downlink system that transmits the movies in non-real time (allowing faster transmission speeds) in encoded digital format, with a decoder at the movie theater to protect against piracy. The system may include means for generating bills to the customers and forwarding the bills for debit payment. The system may also include means for generating royalty payment information for use in paying the content providers for the display of their movies.

BRIEF DESCRIPTION OF THE DRAWINGS

Some of the features of the invention having been stated, other features will appear as the description proceeds, when taken in connection with the accompanying drawings, in which—

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
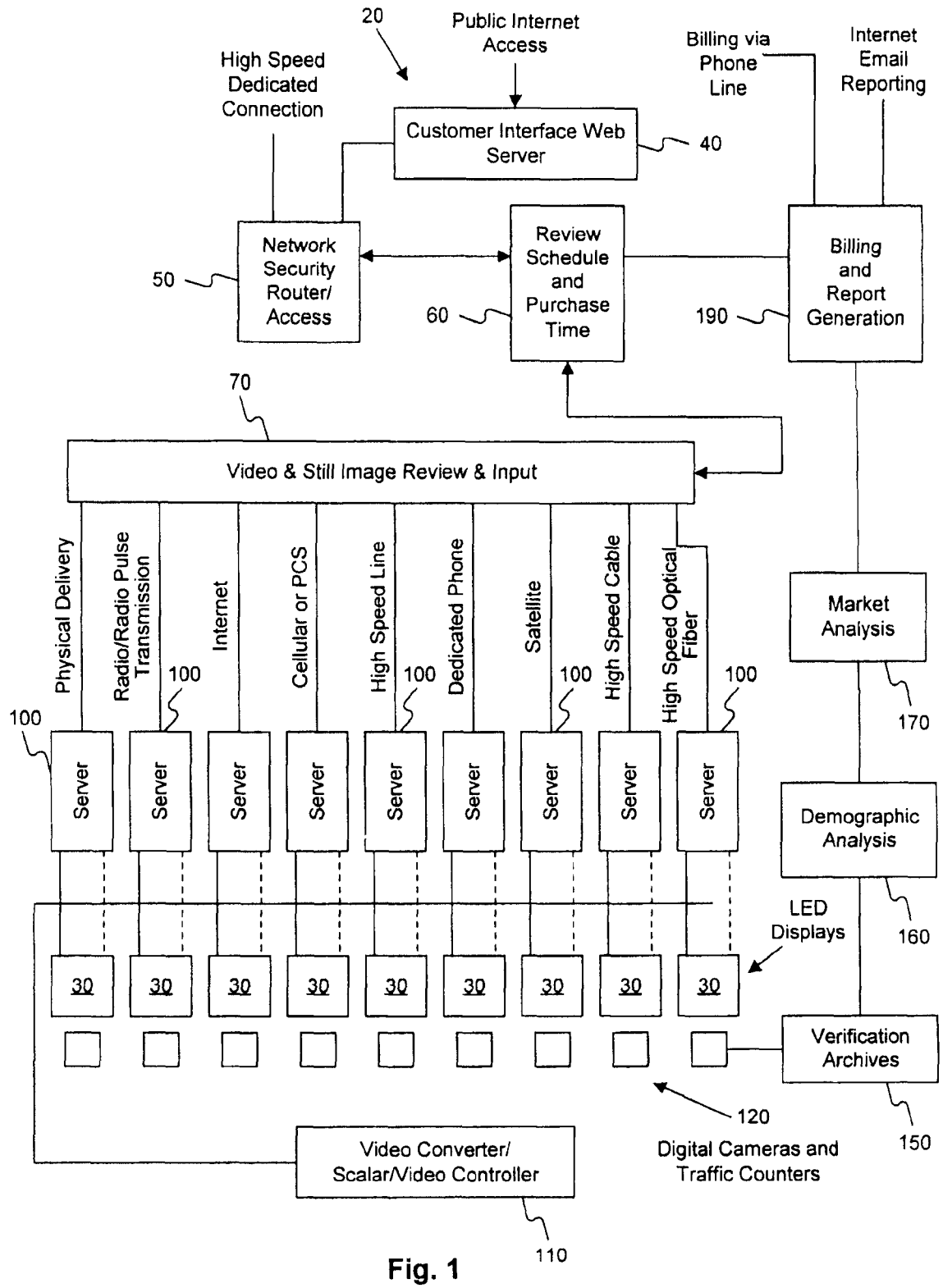
FIG. 1 is a block diagram showing the principal components of a system constructed in accordance with the present invention for advertising purposes.

The Invention Applied to the Display of Commercial Advertising and Other Content Referring to the drawings, and particularly to FIG. 1, there is shown a block diagram of a system 20 for direct placement of commercial advertisements, public service announcements and other content on electronic displays. System 20 includes a network comprising a plurality of electronic displays 30 that are located in high traffic areas in various geographic locations. The displays may be located in areas of high vehicular traffic, and also at indoor and outdoor locations of high pedestrian traffic, as well as in movie theaters, restaurants, sports arenas, casinos or other suitable locations. Thousands of displays, up to 10,000 or more displays worldwide, may be networked according to the present invention. In preferred embodiments, each display is a large (for example, 23 feet by 33½ feet), high resolution, full color display that provides brilliant light emission from a flat panel screen.

A customer of system 20, for example an in-house or agency representative of a consumer products company, may access a central information processing station of the system via the Internet through a Customer Interface Web Server 40. The customer interface web server has a commerce engine and permits the customer to obtain and enter security code and billing code information into a Network Security Router/Access module 50. Alternatively, high usage customers of the system may utilize a customer interface comprising a high speed dedicated connection to module 50. Following access, the customer reviews options concerning his order by reviewing available advertising time/locations through a Review Schedule and Purchase Time module 60 that permits the customer to see what time is available on any display throughout the world and thereafter schedule and purchase the desired advertising time slot. Next, the customer transmits the advertising content on-line through the Internet, a direct phone line or a high speed connection (for example, ISDN, or other suitable high speed information transfer line) for receipt by the system's Video & Still Image Review and Input module 70. In parallel, the system operator may provide public service announcements and other content to module 70. All content, whether still image or video, is formatted in NTSC, PAL, SECAM, YUV, YC, VGA or other suitable formats. In a preferred embodiment, the format is VGA, while all other formats, including but not limited to NTSC, PAL and SECAM, can be run through the video converter 110.

The video & still image review and input module 70 permits a system security employee to conduct a content review to assure that all content meets the security and appropriateness standards established by the system, prior to the content being read to the server 100 associated with each display 30 where the content being transmitted to the server 100 will be displayed. Preferably, the servers are located at their respective displays and each has a backup. An example of a suitable server is the IBM RISC 6000 server.

The means for transmitting content information to the display locations may take a number of forms, with it being understood that any form, or combination thereof, may be utilized at various locations within the network. As shown in FIG. 1, the means include:

a. High speed cable
   b. Satellite
   c. Dedicated phone
   d. High speed line (e.g., ISDN, ADSL)
   e. Cellular, PCS or other data transmission at available frequencies
   f. Internet
   g. Radio/radio pulse transmission
   h. High speed optical fiber
   i. Physical delivery of digitally stored information medium.

A video converter/scaler function and a video controller function provided by module 110 may be utilized in connection with those servers 100 and associated displays 30 that require them, according to data transmission and required reformatting practices well known in the art.

Verification that advertisements do, in fact, run at the intended time at the intended displays may be provided by an information storage module (not shown) linked to each display. Another form of verification may be achieved by a Digital Camera and Traffic Count Recorder 120 that continuously records the content appearing at its respective display 30 and digitally transmits video verification information to a Verification Archives module 150. Recorder 120 also provides traffic count information (for example, 225 vehicles passed the display while an advertisement ran) to verification archives module 150.

Information from verification archives module 150 is utilized by a demographic analysis module 160 and a market analysis module 170 to generate information for reports to be sent to customers after their advertisements run. To this end, analysis data from modules 160 and 170 is transmitted to a Billing and Report Generation module 190 where reports are assembled showing, for example, the time of the advertisement, the content of the advertisement, the traffic count and residence/median income information about those who saw the advertisement. A representative, simplified report for an advertisement running on a single display is as follows:

| Customer: | ABC Cola Co. |
|---|---|
| Ad Content: | Ocean Scene with graphics (content code 1111) |
| Location: | Atlanta, Georgia, Interstate 75N, milepost 125 (site code XXXX) |
| Time: | 7:30 AM, Jun. 30, 2000 |
| Vehicle Count: | 225 |
| Viewer Count: | 340 |
| Viewer Demographics: | 50% Resident Cobb County, GA Median household income: $60,000/yr. 30% Resident DeKalb County, GA Median household income: $52,000/yr. 20% Median household income $55,000/yr. |
| Advertising Cost: | $X |

For an advertisement that may have run at multiple displays, for example 100 displays, a representative report may appear as follows:

| Customer: | ABC Cola Co. |
|---|---|
| Ad Content: | Mountain Scene with graphics (content code 2222) |
| Locations: | 100 sites (site codes YYY . . . ZZZ) |
| Time: | 8:30 AM, Jul. 10, 2000 |
| Total Vehicle Count: | 21,500 |
| Total Viewer count: | 37,200 |
| Viewer Demographics: | Median household income, $49,500 |
| Advertising Cost: | $Y |

Module 190 also produces bills that may be transmitted by phone lines for a debit payment such as a direct bank draft, or other suitable payment mode.

Figure 2:
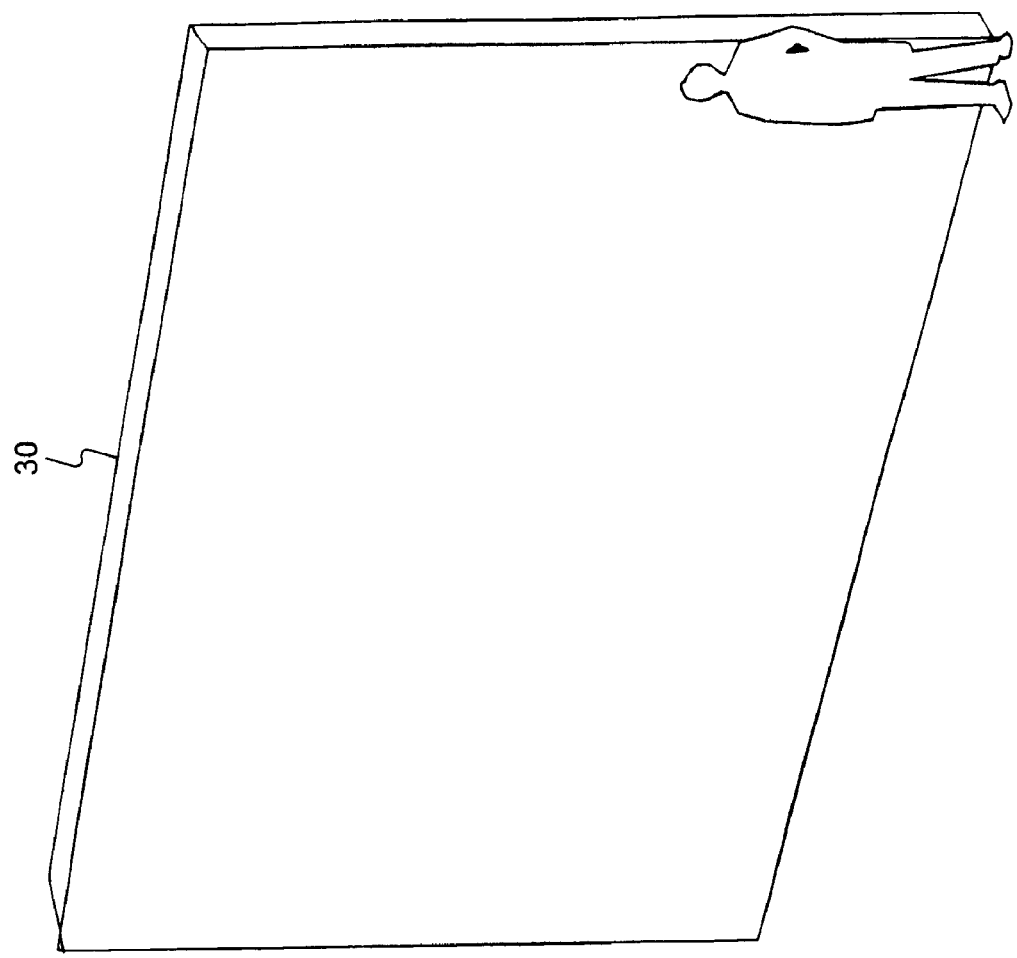
FIG. 2 is a view of one of the electronic displays of the network of FIG. 1.
Figure 2:
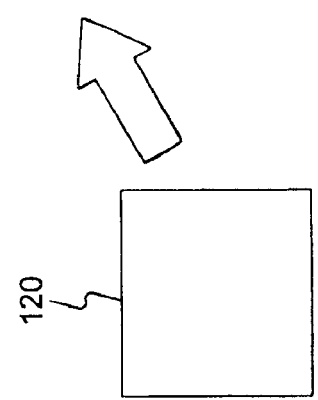

Referring to FIG. 2, there is shown a pictorial view of one preferred form for the electronic displays 30. In this embodiment, display 30 takes the form of a 23 feet by 33½ feet seamless flat screen display including multiple flat panel display modules. The panels utilize advanced semiconductor technology to provide high resolution, full color images utilizing light emitting diodes (LED's) with very high optical power (1.5-10 milliwatts or greater) that are aligned in an integrated array with each pixel having a red, green and blue LED. It will be appreciated that multiple LED's of a given color may be used at pixels to produce the desired light output; for example, three 1.5 milliwatt blue LED's may be used to produce a 4.5 milliwatt blue light output. Each red, green and blue emitter is accessed with 24 bit resolution, providing 16.7 million colors for every pixel.

An overall display of 23 feet by 33½ feet, so constructed, has a high spatial resolution defined by approximately 172,000 pixels at an optical power that is easily viewable in bright sunlight. Suitable display modules for displays 30 are manufactured by Lighthouse Technologies of Hong Kong, China, under Model No. LV50 that utilize, for blue and green, InGaN LED's fabricated on single crystalline $Al_2O_3$ (sapphire) substrates with a suitable buffer layer such as AlN and, for red, superbright AlInGaP LED's fabricated on a suitable substrate such as GaP. These panels have a useful life in excess of 50,000 hours, for example, an expected life under the usage contemplated for network 20 of 150,000 hours and more. In preferred embodiments, the panels are cooled from the back of the displays, preferably via a refrigerant-based air conditioning system (not shown) such as a forced air system or a thermal convection or conduction system. Non refrigerant-based options may be used in locations where they produce satisfactory cooling. The displays preferably have a very wide viewing angle, for example, 160°.

While the Lighthouse Technologies displays utilize the InGaN on sapphire and AlInGaP on GaP LED's described above (and in certain cases InGaN on SiC), other materials may be used for the LED's as follows:

1. (Blue/green) InGaN on SiC, preferably with a suitable buffer layer such as AlN
2. (Blue/green) InGaN on GaN
3. (Blue/green) InGaN on AlN, preferably with a suitable buffer layer such as AlN.
4. (Blue/green) AlN or AlN-containing compound on AiN, sapphire or SiC.

It will be appreciated that the InGaN on sapphire and the other solid state LED's described above have substrates with high optical transmissivity and produce very high optical power. This is important for a number of reasons, including giving the electronic display designers the ability to create very wide viewing angles up to approximately 160°, and the resultant increase in visibility of the displays to viewers in oncoming traffic.

In addition to the particular solid state LED's mentioned above, the discrete sources of blue, green and red light at each pixel may take other forms such as composite devices including an ultraviolet LED that is utilized to excite a phosphor that, in turn, produces light of a selected spectrum. The ultraviolet LED may be formed from a GaN or GaN-containing compound on sapphire with or without suitable buffer layer, or a GaN or GaN-containing compound on SiC, preferably with a suitable buffer layer, or an AlN or AlN-containing compound on AlN, sapphire, SiC or GaN, with or without a suitable buffer layer. In one embodiment, ultraviolet LED's are incorporated into three different composite devices, each with a different phosphor for producing blue, green and red, respectively. In another embodiment, a phosphor is selected to produce white light and a desired color is produced by passing the white light through a band pass filter. According to this white-light embodiment, filters of blue, green and red may be used to create discrete composite devices that produce blue, green and red light at each pixel. The use of white light with appropriate band pass filters has the advantage of producing a colored light with an excellent wave length distribution that will not change appreciably over time, a desirable property for color balancing. On the other hand, the use of three different phosphors to directly produce blue, green and red without a filter has the advantage of higher efficiency because light is not filtered out. Both approaches have the advantage of excellent persistence which, as known in the art, is a desirable feature that is especially important in video applications, particularly digital movie theater applications that are discussed in detail below.

It will be appreciated that energy sources other than ultraviolet LED's may be used to excite the phosphors of the composite devices discussed immediately above.

In the case of low ambient light applications, such as digital movie theaters, lower power LED's may be used. Furthermore, higher power LED's may be used to provide a light source for an LCD shutter-type screen as described in U.S. Pat. No. 5,724,062, incorporated herein by reference.

The provision of one or more high resolution, highly aligned digital cameras at each display site, for example the camera or cameras utilized in digital camera and traffic counter 120, or other specifically dedicated cameras, provides a means permitting in situ diagnostics and calibration of the displays. As known in the art, certain digital cameras have a resolution of over 7,000,000 pixels—as compared to approximately 172,000 pixels on the above-described 23×33½ ft. display. Thus, by directing a digital camera at a display, or directing multiple digital cameras at different discrete portions of a display, a correspondence may be attained where a portion of each digital camera's image corresponds to a single pixel in the display. Suitable means for aligning the digital camera with the display is used, for example, optical means such as laser alignment marks. At selected times set aside for diagnostics and calibration, such as a five minute period each night, the entire display may be run red, then green, then blue, followed by white, all at multiple power levels. In order to reduce interference, the LED's may be switched on individually for a short period, for example one millisecond each. In the most basic diagnostic operation carried out when the display is run red/green/blue, the camera(s), mounted at a selected distance from the display such as sixty feet away, are capable of detecting nonfunctioning or excessively degraded LED's for replacement.

Beyond replacing defective LED's, each night the system may automatically re-calibrate all LED's in the display. To this end, the display is run red/green/blue at several iterative power levels (e.g., 20%/40%/60%/80%/100%) and the optical power output of each LED is sensed for each power level, with the goal being to calibrate the system so that each red, green or blue LED has the same optical power output at each power level as do the other LED's of the same color. Calibration preferably is achieved by diode recalibration scaler software (e.g., look up table) that may be associated with a scaler (not shown) that acts independently in conjunction with the video converter/scaler at 110 (FIG. 1). The diode recalibration scaler receives information from the diagnostic equipment indicating the optical power output of each LED at the various power levels and, through an associated automatic calibration LED look-up table, accounts for daily variance in LED output (degradation or increase) by adjusting the power curve by which the LED will be driven the next day. This periodic (e.g. daily) in situ recalibration has the benefit of greatly reducing on site maintenance since LED's that have degraded can be run harder to compensate for the degradation, eliminating the need for frequent replacement.

As an alternative to using digital cameras for the diagnostic and calibration function, in other embodiments miniature photodector chips, with or without band pass filters, may be located in close proximity to each LED in the display for measuring LED light output during diagnostic/calibration operations.

As another alternative, a programmable chip may be located at each pixel so that each individual chip may be reprogrammed as necessary during each calibration sequence to raise or lower the effective light output of the LED's contained in the pixel.

As an alternative to performing daily in situ calibration by looking at every pixel in sequence and adjusting the scaling value for each pixel, a statistical modeling approach may be utilized. According to this approach, selected LED's or groups of LED's may be run in iterative power cycles in order to optimize the overall screen color through statistical analysis to provide a new scaling value for each LED or group of LED's.

When the diagnostic operation operates with an all white display, the three LED's at each pixel may be evaluated individually and collectively to assure that the pixel is contributing the proper spectrum and amount of white light. Through a diagnostic/calibration software package that interrelates output and peak wave length response for each red/green/blue LED at a pixel to the desired white light response, an iterative calibration may be undertaken at each pixel to adjust the values contained in the diode recalibration scaler software or to reprogram programmable logic chips that determine the drive current for each LED located in a specific pixel.

It will be appreciated that split screen images may be displayed at the displays 30. In the simplest application, a still image advertisement may be one half corporate logo and one half scenery. Beyond this simple application, split screen capability may be used to present a portion of the image as a corporate logo, or the like, and the remainder either real time (or near real time) video or still frame. For example, a previously qualified customer with acceptable internal content review procedures may have direct access to a display or displays for the purpose of displaying a real time (or near real time) sports event, news event, or the like, in conjunction with the customer's corporate logo. This display may be achieved by utilizing high speed servers 100 or by bypassing the servers altogether. High speed still image or video transfer may be facilitated by compression techniques such as JPEG and MPEG II, known in the art.

While advertising scheduling and purchasing may take place as described above where customers directly purchase time from available slots according to a fixed fee schedule, it will be appreciated that alternative modes may be used. For example, an auction system such as introduced by eBay Corporation may be used where all previously purchased slots and all unsold slots are auctioned through a bid process (a "total" auction). Additionally, a limited auction may be utilized where time may be purchased and booked for a set price, but all time not purchased at the set price becomes available through auction at a fixed time before the run time, for example, one month before run time. As another alternative for a portion of the available time slots, a high usage customer may establish a monthly advertising budget with the system operator that authorizes the operator to select the time slots for display of the customer's advertisements at "best available rate" pricing, taking advantage of last minute availability of time slots and other time slot placement techniques that enable the operator to more completely utilize the network. This or similar time slot placement practices when used for a portion of the available time slots may be implemented by a software package that takes into account the needs of both the customer and the system operator.

It will be appreciated that advertising content information may be transmitted to the electronic display locations by physically delivering a suitable information storage device such as CD ROM, zip drive, DVD ROM or DVD RAM This approach may be utilized to transmit information to displays at any desired location, for example, to remote locations, to movie theaters, etc.

Figure 3:
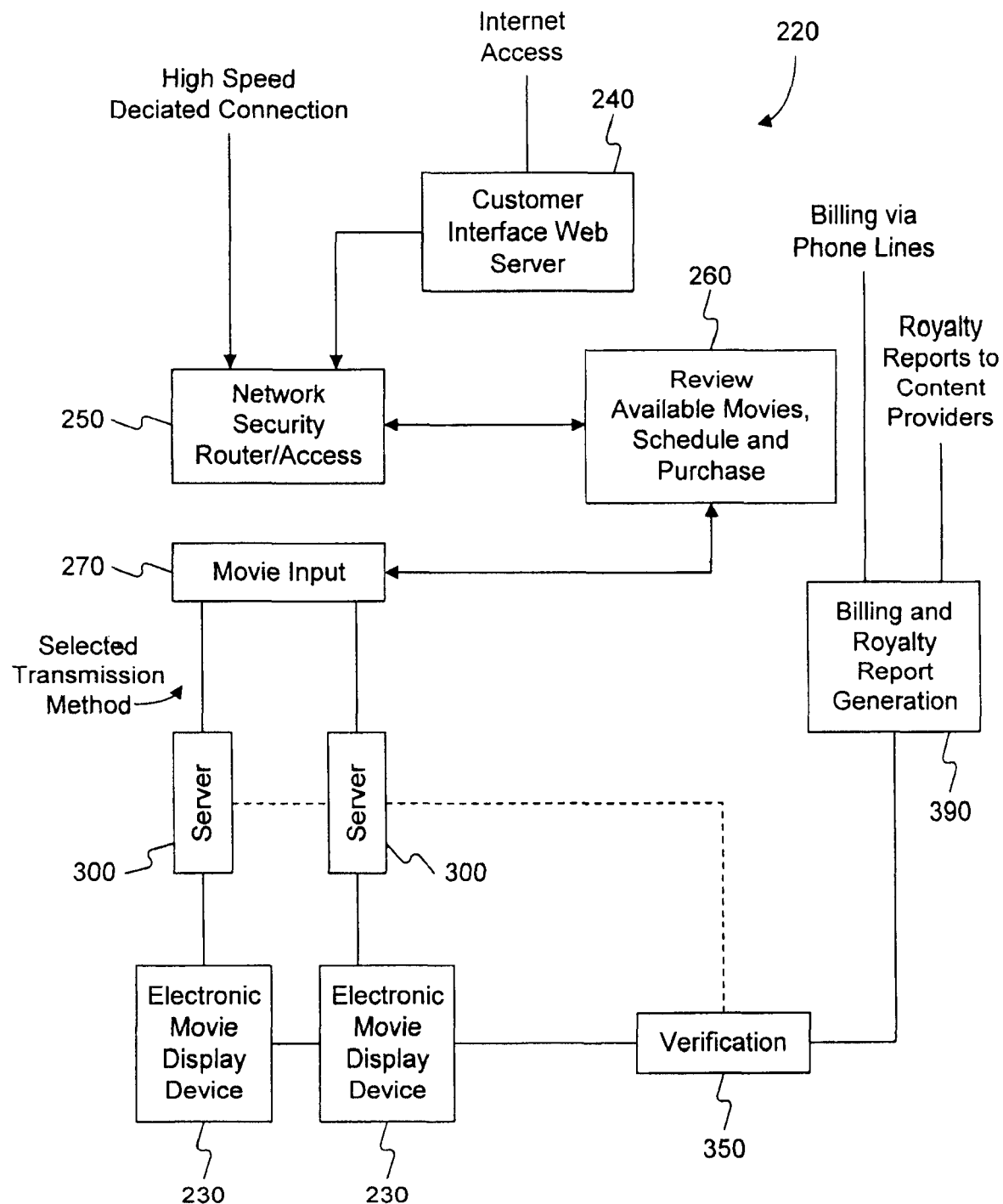
FIG. 3 is a block diagram showing the principal components of a system constructed in accordance with the present invention for the purpose of distributing digital movies to movie theaters.

The Invention Applied to Distribution of Movies in Digital Form to Movie Theaters Referring to FIG. 3, there is shown a block diagram of a system 220 for distribution of movies in digital form to movie theaters. System 220 includes a network connecting a plurality of electronic movie display devices 230 located in movie theaters of customers of system 220. The movie theaters may be "single screen" theaters having only one display device 230, such as small art houses. The theaters may also be smaller theaters with only two or three screens up to large mega-theaters having twenty or more display devices 230. The electronic movie display devices 230 may take several forms, each of which is fully capable of displaying movies to an audience of 50-100 or more movie goers. The various types of display devices 230 will be described in detail below.

A customer of system 220, a responsible party representing the movie theater and referred to herein as a movie theater operator, may access a central information processing station of the system via the Internet through a Customer Interface Web Server 240. The customer interface web server has a commerce engine and permits the customer to obtain and enter security code and billing code information into a Network Security Router/Access module 50. Alternatively, high usage customers of the system may utilize a customer interface comprising a high speed dedicated connection to module 50. Following access, the customer reviews options concerning his order by reviewing the available movies through a Review Available Movies and Purchase module 260 that permits the customer to see what movies are available, and thereafter schedule and purchase a movie for display utilizing one or more of the customer's electronic movie display devices 230.

Following scheduling and purchasing, the customer-ordered movie is transmitted to a server 300 associated with the customer's movie theater. Preferably, the servers are located at their respective displays 230 and each has a backup. An example of a suitable server is the IBM RISC 6000 server.

The means for transmitting digital movie content to the movie theaters may take a number of forms, with it being understood that any form, or combination thereof, may be used at various locations within the network. In one preferred embodiment of the invention as used in association with the distribution of digital movies, a satellite uplink/downlink system is used to transmit high speed, compressed, non-real time data on a plurality of channels. Each movie theater is in communication via a satellite downlink and has a decoder and a computer-based data storage device. As an example, a satellite may dedicate 100 channels to the continuous transmission of movies in non-real time, for example 3× real time transmission rates, so that approximately 4000 movies per day can be transmitted and are available for movie theater reception. The server (storage device) at each movie theater is programmed at the time the theater owner places an order for a movie to receive and store the particular movie when it is transmitted so that it can be available for screening at the theater at the desired time.

In addition to the above described satellite transmission system, other transmission systems (for example, certain ones of the systems discussed in connection with FIG. 1) may be used either with real time or non-real time transmission. Thus, using a proprietary network of the present invention, a movie theater operator can schedule over the Internet which movies he wants to receive to his server(s) Movies will be encoded so that they will play only on a proprietary operating system. The operating system preferably has a modem that may be queried by the system's billing system on a periodic basis to bill the account. By continuously providing significant content through the satellite transmission system, movie producers, or other content owners, always have all of their content available for sale. Because the system will be providing its own receiver, server and proprietary software system that will support the digital projection units, the encoded content transmitted to each theater is protected from piracy.

In addition to the transmission techniques described above, it will be appreciated that the system may operate utilizing a "platter" of CD ROM, DVD RAM, DVD ROM, tapes or the like on site at each server associated with each digital movie display device 230.

As stated above, any suitable type of digital movie display device may be utilized in the movie theaters that are customers of system 220. Examples are as follows:

1. A large, seamless, flat screen LED display having relatively low power LED's suitable for the low ambient light conditions of a movie theater.
2. A high resolution, full color display utilizing high power LED's providing a light source for an LCD shutter-type screen as described in U.S. Pat. No. 5,724,062, incorporated herein by reference.
3. A projection system based on the digital light processing (DLP) technology developed by Texas Instruments. Complete electronic movie display systems utilizing the Texas Instruments DLP technology are sold by various manufacturers, including Runco, for example, Runco product VX7.
4. Reflective LCD technology developed by Hughes/JVC and Reflective Technologies can provide a completely digital, flat panel, full color movie screen.

Figure 4:
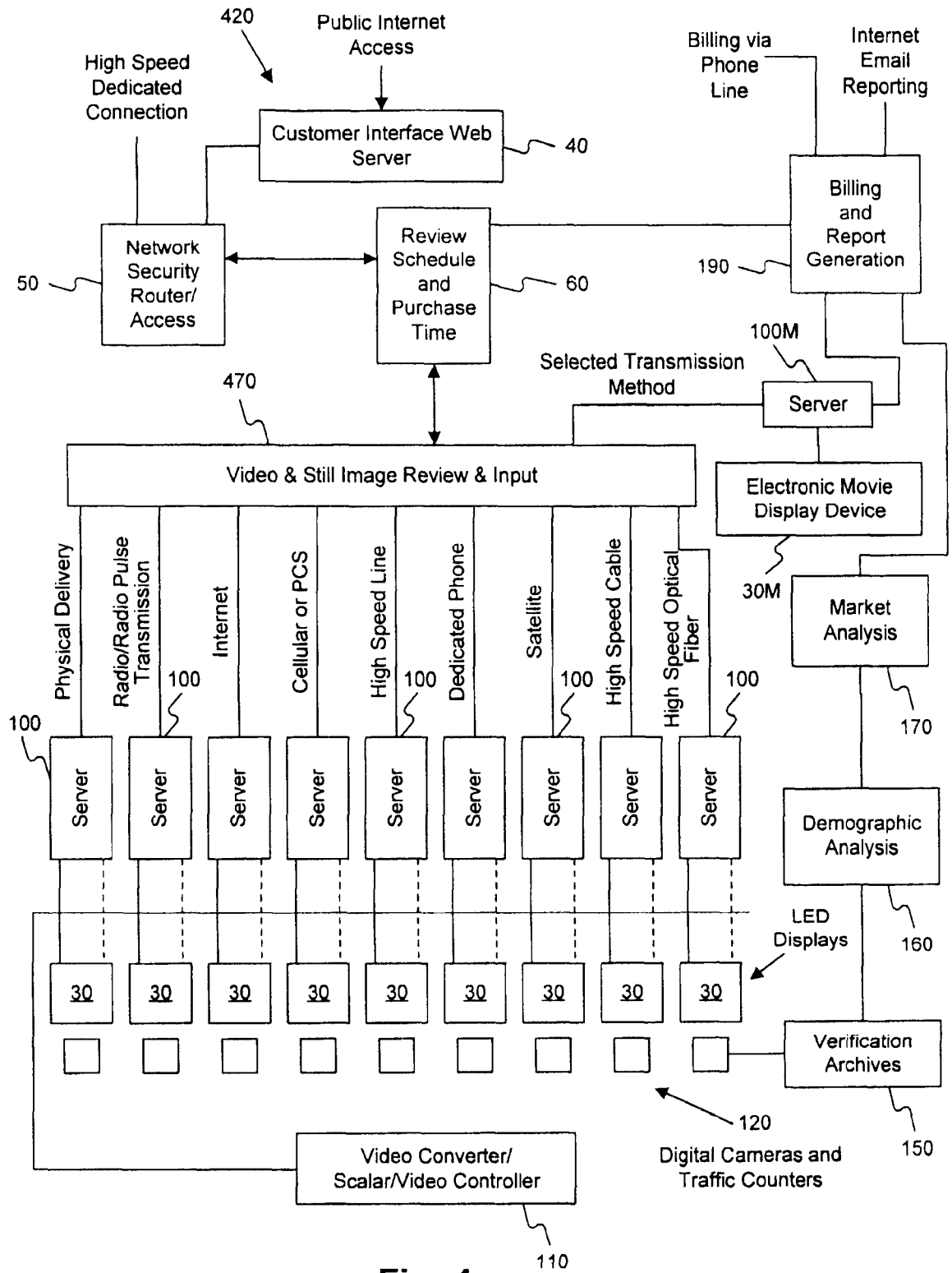
FIG. 4 is a block diagram showing a system that is used for both advertising purposes and for the distribution of digital movies to movie theaters.

FIG. 4 illustrates another system 420 including a network connecting both electronic displays 30 intended for advertising in high traffic areas and electronic movie display devices 230 intended for use as movie "screens" in digital movie theaters. According to this embodiment of the invention, input module 470 transmits advertising content to displays 30 in the manner described above in connection with the embodiment of FIG. 1, while also serving to transmit movies in digital form to movie theaters having a server 100M and electronic movie display devices 30M.

While the present invention has been described with reference to specific embodiments, it will be appreciated that modifications may be made without departing from the true spirit and scope of the invention.

That which is claimed:

1. A system for the delivery and display of content in movie theaters and in high traffic areas, the system comprising:
    (a) a network interconnecting a plurality of movie theaters, wherein each theater comprises a plurality of display screens, wherein the plurality of display screens at each movie theater comprises:
        (i) at least one of a first type of display screen, wherein the first type of display screen comprises a movie screen for displaying movies within a first type of area in the movie theater, and
        (ii) a plurality of a second type of display screen for displaying advertisements, wherein the second type of display screen comprises display screens located in high traffic areas within the movie theater, wherein the high traffic areas are different from the first type of area, wherein the at least one movie screen within the movie theater and the plurality of display screens located in high traffic areas within the movie theater are in communication with the network;

(b) a customer interface operable to
  (i) allow a customer to view a schedule of available display locations and time slots, wherein the available display locations are selected from the second type of display screens,
  (iii) allow a customer to schedule presentation of advertising content on one or more of the second type of display screens by selecting at least one display screen and at least one time slot from the schedule of available display locations and time slots, and
  (ii) receive advertising content digitally transmitted from the customer;
(c) a central processing system located remotely from the movie theaters, wherein the central processing system is in communication with the customer interface, wherein the central processing system is configured to schedule the display of advertising content on selected ones of said second type of display screens located in the movie theaters in accordance with the selection made by the customer via the customer interface; and
(d) means for digitally transmitting content to the movie theaters from the central processing system via the network for display on at least a portion of the plurality of display screens, wherein the content transmitted to the movie theaters comprises advertising content for display in high traffic areas within the movie theater and content for display on the at least one movie screen within the movie theater.

2. The system of claim 1, further comprising at least one server at each movie theater for receiving and storing content transmitted from the central processing system.

3. The system of claim 1, wherein the at least one movie screen comprises at least one DLP projector.

4. The system of claim 1, wherein the at least one movie screen comprises at least one LED display.

5. The system of claim 1, further comprising a verification module operable to verify display of content on at least a portion of the plurality of display screens, wherein the verification module is operable to provide verification data to the central processing system.

6. The system of claim 5, wherein the verification module comprises a digital camera.

7. The system of claim 1, further comprising a counter operable to count a number of viewers relative to at least a portion of the plurality of display screens, wherein the counter is operable to provide viewer numerical data to the central processing system.

8. The system of claim 1, wherein said means for transmitting comprises a satellite uplink/downlink system.

9. The system of claim 8, wherein said satellite uplink/downlink system transmits content in non-real time.

10. The system of claim 1, wherein the central processing system further comprises a report generation module, wherein the report generation module is operable to generate a report relating to the display of content at one or more of the movie theaters.

11. The system of claim 1, wherein each movie theater is associated with a movie theater operator, the system further comprising a movie theater scheduling module, wherein the movie theater scheduling module is operable by the movie theater operator to schedule the display of transmitted content on one or more movie screens at the movie theater associated with the movie theater operator.

12. The system of claim 11, wherein the movie theater scheduling module is provided by the central processing system.

13. The system of claim 1, wherein at least one display screen of the plurality of display screens located in high traffic areas within each movie theater comprises a light emitting flat panel screen.

14. A method for displaying content on display screens within movie theaters, the method comprising:
  (a) providing a movie screen within a movie theater;
  (b) providing a plurality of display screens located in high traffic areas within the movie theater;
  (c) providing a telecommunications network, wherein the movie screen and the plurality of display screens are in communication with the telecommunications network;
  (d) providing a customer interface in communication with the telecommunications network;
  (e) permitting an advertiser to review a schedule of available display locations and time slots for displaying advertising content on the plurality of display screens via the customer interface;
  (f) permitting an advertiser to select at least one display screen and at least one time slot from the schedule of available display locations and time slots via the customer interface;
  (g) receiving advertising content uploaded by an advertiser via the customer interface;
  (h) transmitting digital content from a remote location to the movie theater via the telecommunications network, wherein the transmitted content includes advertiser uploaded advertising content for display on the plurality of display screens located in high traffic areas within the movie theater, wherein the transmitted content further includes content for display on the movie screen;
  (i) storing the transmitted content for display on the movie screen at the movie theater for later display on the movie screen;
  (j) permitting an operator at the movie theater to select one or more times for the display of the stored content for display on the movie screen; and
  (k) displaying the transmitted digital content on:
    (i) the movie screen, wherein the act of displaying the transmitted digital content comprises displaying the content for display on the movie screen stored at the movie theater on the movie screen in accordance with the one or more times selected by the operator at the movie theater, and
    (ii) at least one of the plurality of display screens located in high traffic areas within the movie theater, wherein the act of displaying the transmitted digital content further comprises displaying the advertiser uploaded advertising content on the at least one of the plurality of display screens located in high traffic areas within the movie theater in accordance with the one or more time slots selected by the advertiser.

15. The method of claim 14, wherein the movie theater has a storage device, wherein the act of transmitting the digital content comprises transmitting the digital content to the storage device of the movie theater, wherein the displayed digital content is displayed from the storage device.

16. The method of claim 14, further comprising:
  (a) obtaining demographic information relating to viewers; and
  (b) transmitting the demographic information via the telecommunications network.

* * * * *